(12) United States Patent
Sugimoto et al.

(10) Patent No.: US 10,328,761 B2
(45) Date of Patent: Jun. 25, 2019

(54) SUSPENSION CONTROLLER AND SUSPENSION APPARATUS

(71) Applicant: Showa Corporation, Gyoda-shi (JP)

(72) Inventors: Masaki Sugimoto, Haga-gun (JP); Hiroaki Kurihara, Haga-gun (JP)

(73) Assignee: SHOWA CORPORATION, Gyoda-Shi (JP)

( * ) Notice: Subject to any disclaimer, the term of this patent is extended or adjusted under 35 U.S.C. 154(b) by 24 days.

(21) Appl. No.: 15/465,204

(22) Filed: Mar. 21, 2017

(65) Prior Publication Data

US 2017/0282666 A1 Oct. 5, 2017

(30) Foreign Application Priority Data

Mar. 29, 2016 (JP) .................................. 2016-066911

(51) Int. Cl.
*B60G 17/015* (2006.01)
*F16F 9/32* (2006.01)
(Continued)

(52) U.S. Cl.
CPC ....... *B60G 17/0152* (2013.01); *B60G 17/018* (2013.01); *B60G 17/08* (2013.01);
(Continued)

(58) Field of Classification Search
CPC .. B60G 17/0152; B60G 17/08; B60G 17/018; B60G 2600/09; B60G 2600/02; B60G 2500/11; B60G 2400/90; B60G 2400/202; B60G 2206/41; B60G 2202/312; B60G 2204/129; B60G 2204/12422; B60G 15/068; B60G 15/07; B60G 2500/106; B60G 2202/12; B60G 2202/24; B60G 2600/26; B60G 15/063; B60G 2600/181; B60G 2204/128; F16F 9/3465; F16F 9/537; F16F 9/325

See application file for complete search history.

(56) References Cited

U.S. PATENT DOCUMENTS 6,016,454 A * 1/2000 Ichimaru ............. B60G 17/015
280/5.514

FOREIGN PATENT DOCUMENTS

DE 102008052990 A 4/2009
JP 11-51236 A 2/1999
(Continued)

OTHER PUBLICATIONS

Extended European Search Report dated Jul. 25, 2017 for the corresponding European Patent Application No. 17162513.0.

*Primary Examiner* — Yuen H Wong
(74) *Attorney, Agent, or Firm* — Leason Ellis LLP

(57) ABSTRACT

A suspension controller includes a target current setting unit configured to set a target current value, a current limitation setting unit configured to set a current limitation value, a current detector configured to detect a current value of a first current supplied to a solenoid that is configured to control a damping force of a suspension, a duty ratio setting unit configured to set a duty ratio based on the target current value, based on the current limitation value, and based on the current value detected by the current detector; and a current outputting unit configured to supply the solenoid with a second current that corresponds to the duty ratio set by the duty ratio setting unit and to a power supply voltage. The current limitation setting unit is configured to change the current limitation value based on the duty ratio set by the duty ratio setting unit.

12 Claims, 9 Drawing Sheets

(51) Int. Cl.
  *F16F 9/346* (2006.01)
  *F16F 9/53* (2006.01)
  *B60G 17/018* (2006.01)
  *B60G 17/08* (2006.01)
  *B60G 15/06* (2006.01)
  *B60G 15/07* (2006.01)

(52) U.S. Cl.
  CPC ............ *F16F 9/325* (2013.01); *F16F 9/3465* (2013.01); *F16F 9/537* (2013.01); *B60G 15/063* (2013.01); *B60G 15/068* (2013.01); *B60G 15/07* (2013.01); *B60G 2202/12* (2013.01); *B60G 2202/24* (2013.01); *B60G 2202/312* (2013.01); *B60G 2204/128* (2013.01); *B60G 2204/129* (2013.01); *B60G 2204/12422* (2013.01); *B60G 2206/41* (2013.01); *B60G 2400/202* (2013.01); *B60G 2400/90* (2013.01); *B60G 2500/106* (2013.01); *B60G 2500/11* (2013.01); *B60G 2600/02* (2013.01); *B60G 2600/09* (2013.01); *B60G 2600/181* (2013.01); *B60G 2600/26* (2013.01)

(56) References Cited

FOREIGN PATENT DOCUMENTS

| WO | WO-2015/098217 A | 7/2015 | |
|---|---|---|---|
| WO | WO-2015098217 A1 * | 7/2015 | ......... B60G 17/0155 |

* cited by examiner

SUSPENSION CONTROLLER AND SUSPENSION APPARATUS

CROSS-REFERENCE TO RELATED APPLICATIONS

The present application claims priority under 35 U.S.C. § 119 to Japanese Patent Application No. 2016-066911, filed Mar. 29, 2016. The contents of this application are incorporated herein by reference in their entirety.

BACKGROUND

Field

The present invention relates to a suspension controller and a suspension apparatus.

Background

Japanese Unexamined Patent Application Publication No. 11-51236 discloses a suspension controller that controls damping force of a suspension using a solenoid.

The suspension controller adjusts a duty ratio in a pulse width modulation (PWM) control to control current supplied to the solenoid.

SUMMARY

According to one aspect of the present invention, a suspension controller includes a target current setting unit, a current limitation setting unit, a current detector, a duty ratio setting unit, and a current outputting unit. The target current setting unit is configured to set a target current value. The current limitation setting unit is configured to set a current limitation value. The current detector is configured to detect a current value of a first current supplied to a solenoid that is configured to control a damping force of a suspension. The duty ratio setting unit is configured to set a duty ratio based on the target current value, based on the current limitation value, and based on the current value detected by the current detector. The current limitation setting unit is configured to change the current limitation value based on the duty ratio set by the duty ratio setting unit. The current outputting unit is configured to supply the solenoid with a second current that corresponds to the duty ratio set by the duty ratio setting unit and to a power supply voltage.

According to another aspect of the present invention, a suspension controller includes target current setting units, current limitation setting units, current detectors, duty ratio setting units, and current outputting units. Each of the target current setting units corresponds to one of the plurality of suspensions and is configured to set a target current value. Each of the current limitation setting units corresponds to one of the plurality of suspensions and is configured to set a current limitation value. Each of the current detectors corresponds to one of the plurality of suspensions and is configured to detect a current value of a first current supplied to an associated solenoid among solenoids that are configured to control damping forces of the plurality of suspensions. Each of the duty ratio setting units corresponds to one of the plurality of suspensions and is configured to set a duty ratio based on the target current value, based on the current limitation value, and based on the current value detected by an associated current detector among the current detectors. Each of the current outputting units corresponds to one of the plurality of suspensions and is configured to supply the associated solenoid with a second current that corresponds to the duty ratio set by the associated duty ratio setting unit and to a power supply voltage. The current limitation setting unit corresponding to the one suspension is configured to: change the current limitation value based on the duty ratio set by the associated duty ratio setting unit; and set a new current limitation value corresponding to the one suspension based on the current limitation value corresponding to the one suspension.

According to the other aspect of the present invention, a suspension apparatus includes a suspension and a suspension controller. The suspension controller includes a solenoid, a target current setting unit, a current limitation setting unit, a current detector, a duty ratio setting unit, and a current outputting unit. The target current setting unit is configured to set a target current value. The current limitation setting unit is configured to set a current limitation value. The current detector is configured to detect a current value of a first current supplied to a solenoid that is configured to control a damping force of a suspension. The duty ratio setting unit is configured to set a duty ratio based on the target current value, based on the current limitation value, and based on the current value detected by the current detector. The current limitation setting unit is configured to change the current limitation value based on the duty ratio set by the duty ratio setting unit. The current outputting unit is configured to supply the solenoid with a second current that corresponds to the duty ratio set by the duty ratio setting unit and to a power supply voltage.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
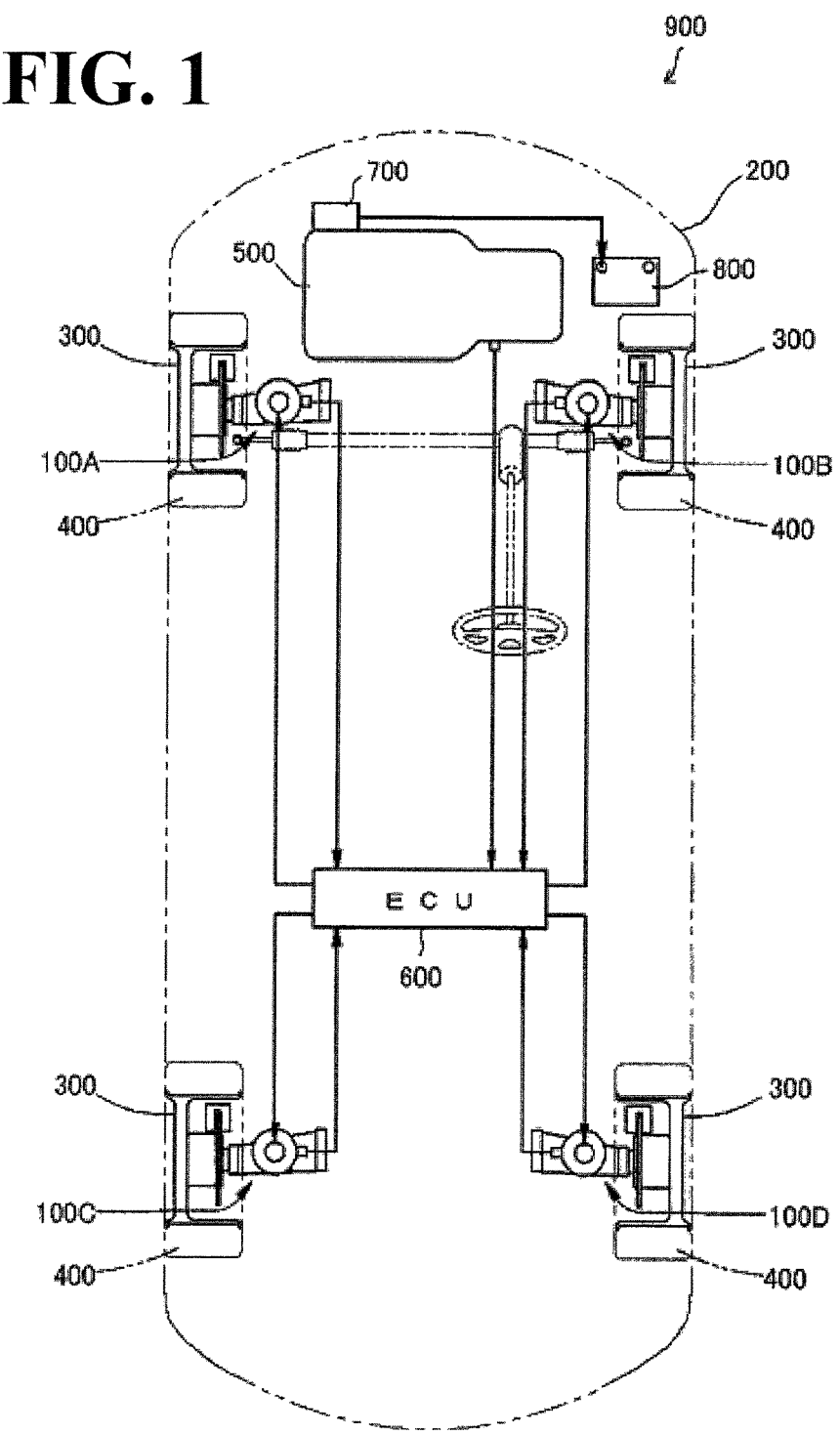
FIG. 1 illustrates a schematic configuration of a vehicle according to a first embodiment of the present invention.

The embodiments will now be described with reference to the accompanying drawings, wherein like reference numerals designate corresponding or identical elements throughout the various drawings.

First Embodiment

A first embodiment of the present invention will be described in detail.

Configuration of Vehicle 900

FIG. 1 is a diagram illustrating a schematic configuration of a vehicle 900 according to this embodiment. As illustrated in FIG. 1, the vehicle 900 includes suspensions 100, a vehicle body 200, wheels 300, tires 400, an engine 500, an electronic control unit (ECU) 600 (or a suspension controller 600), a power generator 700, and a battery 800.

The wheels 300 on which the tires 400 are mounted are suspended from the vehicle body 200 with the suspensions 100. Since the vehicle 900 is a four-wheeled vehicle in this embodiment, the number of the suspensions 100, the wheels 300, and the tires 400 is four each.

The suspensions 100 include a suspension 100A for a front left wheel, a suspension 100B for a front right wheel, a suspension 100C for a rear left wheel, and a suspension 100D for a rear right wheel.

The power generator 700 is attached to the engine 500, and electric power generated by the power generator 700 is stored in the battery 800.

Various electronic devices of the vehicle 900 are subject to centralized control by the ECU 600. As will be discussed below, opening and closing of a solenoid valve 50 (see FIG. 2) of a hydraulic shock absorber 1 in each of the suspensions 100 is controlled by the ECU 600. To enable such a control, electric wires are provided to supply driving power from the ECU 600 to the solenoid valves 50.

The ECU 600 and the suspensions 100, which are controlled by the ECU 600, are also referred to as a suspension apparatus.

Configuration of Suspensions 100

Figure 2:
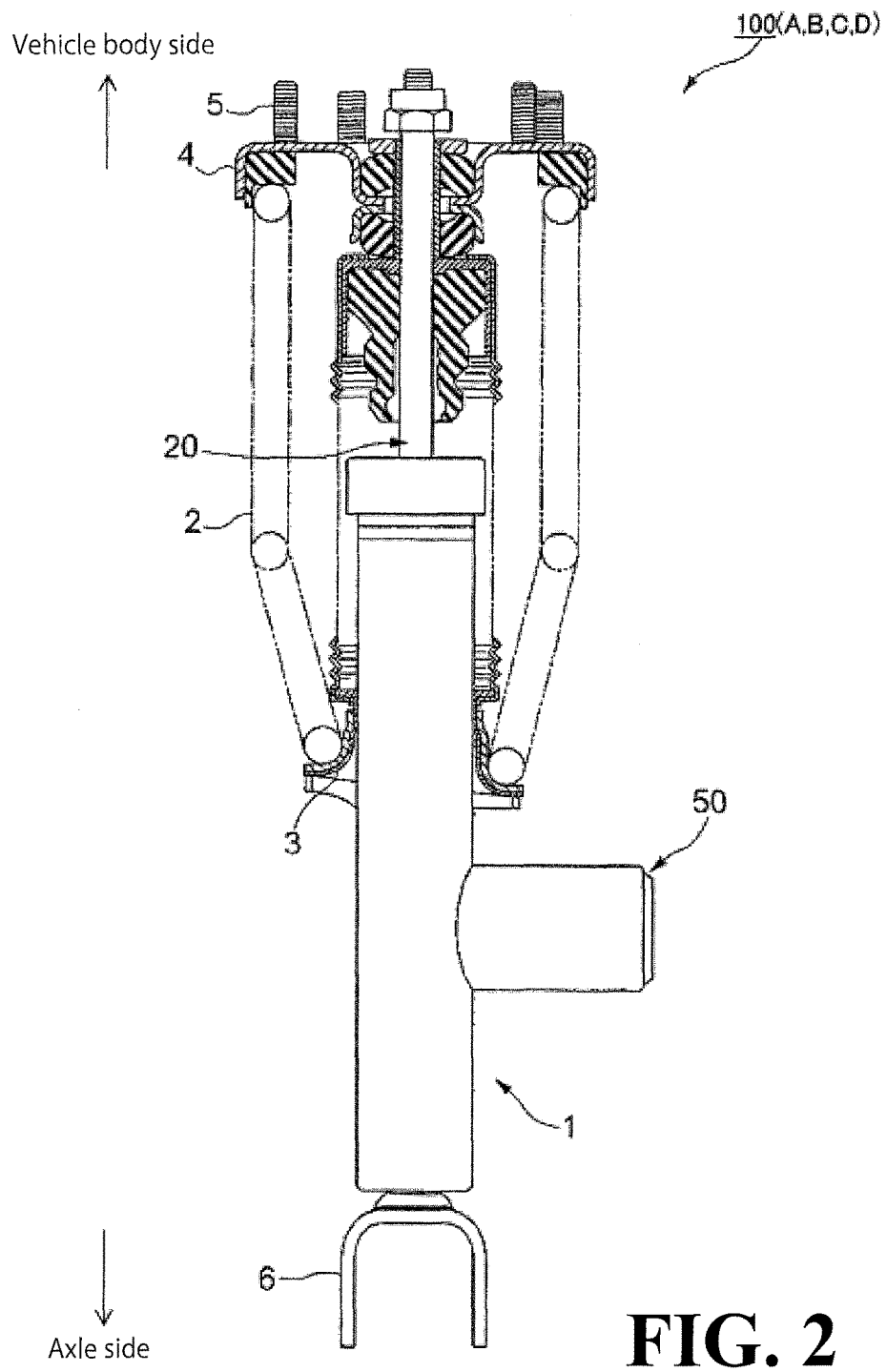
FIG. 2 is a side view of a suspension according to the first embodiment of the present invention.

FIG. 2 is a side view of one of the suspensions 100. Since the suspensions 100A, 100B, 100C, and 100D essentially have the same configuration, the configuration of the suspension 100A will be described. As illustrated in FIG. 2, the suspension 100 includes the hydraulic shock absorber 1 and a coil spring 2. The coil spring 2 is located outside of the hydraulic shock absorber 1. The coil spring 2 is held between a spring seat 3 and a spring seat 4. One end of the suspension 100 is secured to the vehicle body 200 with bolts 5, and the other end of the suspension 100 is secured to the axle of the wheel 300 with an axle side mounting portion 6.

An impact that the vehicle 900 receives from a road surface is absorbed by compression of the coil spring 2. The hydraulic shock absorber 1 generates force (damping force) that damps kinetic energy of the coil spring 2.

Figure 3A:
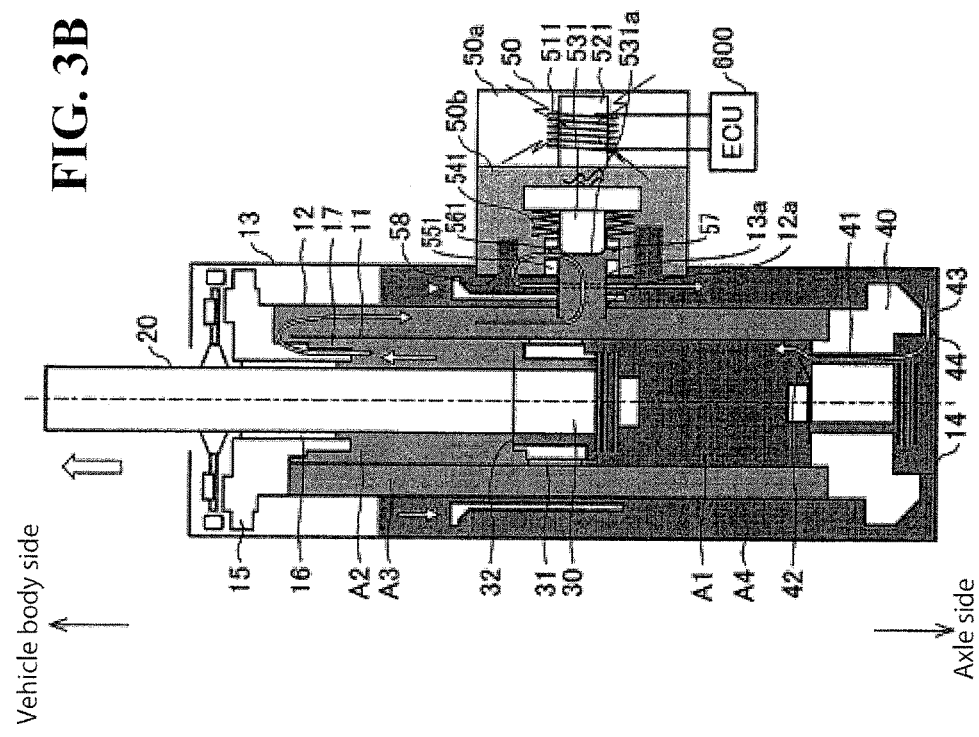
FIGS. 3A and 3B are cross-sectional views of a hydraulic shock absorber according to the first embodiment of the present invention.
Figure 3B:
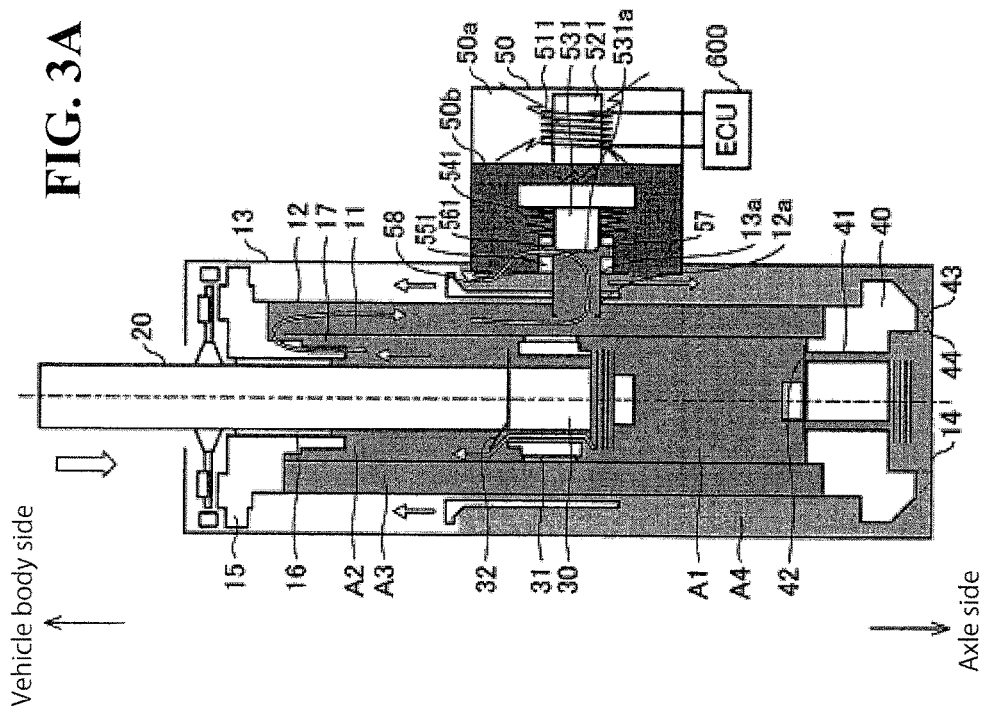

FIGS. 3A and 3B are cross-sectional views of the hydraulic shock absorber 1. As illustrated in FIGS. 3A and 3B, the hydraulic shock absorber 1 has a three-tube structure. The hydraulic shock absorber 1 includes a first cylinder 11, a second cylinder 12, and a damper case 13. The second cylinder 12 is located outside of the first cylinder 11. The damper case 13 is located outside of the second cylinder 12. The first cylinder 11, the second cylinder 12, and the damper case 13 are coaxially arranged with one another.

The first cylinder 11 receives a piston rod 20. The piston rod 20 includes a piston 30 located at the distal end of the piston rod 20. The piston 30 slides against the inner wall surface of the first cylinder 11. The first cylinder 11 stores hydraulic oil in the internal space of the first cylinder 11. The internal space is divided by the piston 30 into a piston side oil chamber A1 and a rod side oil chamber A2.

The ends of the first cylinder 11 and the second cylinder 12 close to the axle abut against a bottom unit 40. The ends of the first cylinder 11 and the second cylinder 12 close to the vehicle body abut against a rod guide 15. The bottom unit 40 and the rod guide 15 define the ends of the oil chambers formed inside the first cylinder 11 and the second cylinder 12.

The rod guide 15 has an opening 16. The piston rod 20 is inserted in the opening 16.

The outer wall surface of the first cylinder 11 and the inner wall surface of the second cylinder 12 define a ring-shaped oil chamber A3. The rod guide 15 and the end of the first cylinder 11 close to the vehicle body define a common passage 17. The ring-shaped oil chamber A3 and the rod side oil chamber A2 communicate each other via the common passage 17.

The outer wall surface of the second cylinder 12 and the inner wall surface of the damper case 13 define a reservoir chamber A4. The reservoir chamber A4 stores hydraulic oil that compensates for the volume of the piston rod 20 that moves in and out of the first cylinder 11.

The damper case 13 has a solenoid valve 50 on a side portion of the damper case 13. The solenoid valve 50 is an electromagnetic valve that adjusts the damping force generated in the hydraulic shock absorber 1. The solenoid valve 50 is secured to a lateral passage 57 with a valve stopper 551. The lateral passage 57 extends through the wall of the second cylinder 12 and the wall of the damper case 13.

The hydraulic oil flows into the internal portion of the solenoid valve 50 from the ring-shaped oil chamber A3 through one of openings of the lateral passage 57. The other opening of the lateral passage 57 receives a valve body 531. The valve body 531 has a protrusion 531a. The valve body 531 adjusts the opening area of damping passages 561. The damping passages 561 extend through the wall of the lateral passage 57 and the valve stopper 551. More specifically, the protrusion 531a is fitted to the inner wall of the lateral passage 57. Changes in the relative position of the protrusion 531a with respect to the openings of the damping passages 561 adjust the opening area of the damping passages 561. In an example illustrated in FIGS. 3A and 3B, the plurality of damping passages 561 are formed. However, the number of the damping passage 561 may be at least one.

The hydraulic oil that has passed through the damping passages 561 flows into a cylindrical oil chamber 50b. The cylindrical oil chamber 50b is defined by the housing of the solenoid valve 50. The hydraulic oil that has flowed into the cylindrical oil chamber 50b flows into the reservoir chamber A4 through a discharge port 58.

The solenoid valve 50 includes a coil 511 and a core 521. The coil 511 and the core 521 are solenoid mechanisms. Supplying power to the coil 511 generates electromagnetic force that separates the valve body 531 from the core 521. The coil 511 and the core 521 are accommodated in a control chamber 50a. The control chamber 50a is separated from the cylindrical oil chamber 50b, in which the valve body 531 is located.

The electromagnetic valve for adjusting the damping force of the hydraulic shock absorber 1 may be any electromagnetic valve other than a solenoid valve. For example, the above-described electromagnetic valve may be any electromagnetic valve that uses electromagnetic fluid (magnetic fluid).

The valve stopper 551 and the valve body 531 sandwich a spring 541. The spring 541 exerts spring force in a direction to increase the distance between the valve stopper 551 and the valve body 531. The existence of the spring 541 prevents the valve body 531 from colliding with the valve stopper 551 when the valve body 531 moves in a direction to approach the valve stopper 551.

The piston 30 includes a compression side passage 31. The compression side passage 31 allows hydraulic oil to flow from the piston side oil chamber A1 to the rod side oil chamber A2. The compression side passage 31 has a compression side check valve 32 located at the opening close to the vehicle body.

The bottom unit 40 includes a rebound side passage 41. The rebound side passage 41 allows hydraulic oil to flow from the reservoir chamber A4 to the piston side oil chamber A1. The rebound side passage 41 has a rebound side check valve 42 located at the opening close to the vehicle body. The bottom unit 40 has a ring-shaped protrusion 43 formed on the surface close to the axle. The ring-shaped protrusion 43 projects toward a bottom portion 14 of the damper case 13 and contacts the bottom portion 14. The ring-shaped protrusion 43 includes a bottom portion passage 44. The hydraulic oil in the reservoir chamber A4 flows toward the rebound side passage 41 through the bottom portion passage 44.

Flow of Hydraulic Oil in Compression Stroke

When the vehicle 900 receives an impact force from a road surface, the piston rod 20 enters inside the first cylinder 11 (compression stroke). Upon the above operation, the piston 30 compresses the hydraulic oil in the piston side oil chamber A1. The compressed hydraulic oil flows through the compression side passage 31, opens the compression side check valve 32, and flows into the rod side oil chamber A2.

When the piston rod 20 enters inside the first cylinder 11, the volume of the first cylinder 11 is reduced. Thus, the hydraulic oil in the rod side oil chamber A2 flows through the common passage 17 into the ring-shaped oil chamber A3. The hydraulic oil that has flowed into the ring-shaped oil chamber A3 flows through the lateral passage 57 into the solenoid valve 50 and passes through the damping passages 561. The protrusion 531a of the valve body 531 regulates the opening areas of the damping passages 561. Thus, when the hydraulic oil passes through the damping passages 561, damping force is generated.

The hydraulic oil that has flowed through the damping passages 561 into the cylindrical oil chamber 50b flows through the discharge port 58 into the reservoir chamber A4.

Flow of Hydraulic Oil in Rebound Stroke

When the piston rod 20 moves out from the first cylinder 11 (rebound stroke), the piston 30 pushes out the hydraulic oil in the rod side oil chamber A2. The hydraulic oil passes through the common passage 17 and flows into the ring-shaped oil chamber A3. The hydraulic oil that has flowed into the ring-shaped oil chamber A3 passes through the lateral passage 57 and the damping passages 561 like in the compression stroke and generates damping force.

The hydraulic oil that has flowed through the damping passages 561 into the cylindrical oil chamber 50b flows through the discharge port 58 into the reservoir chamber A4.

When the piston rod 20 moves toward the outside of the first cylinder 11, the piston side oil chamber A1 has a negative pressure. Thus, the hydraulic oil in the reservoir chamber A4 passes through the bottom portion passage 44 and the rebound side passage 41, opens the rebound side check valve 42, and flows into the piston side oil chamber A1.

Configuration and Function of Solenoid Valve 50

Figure 4:
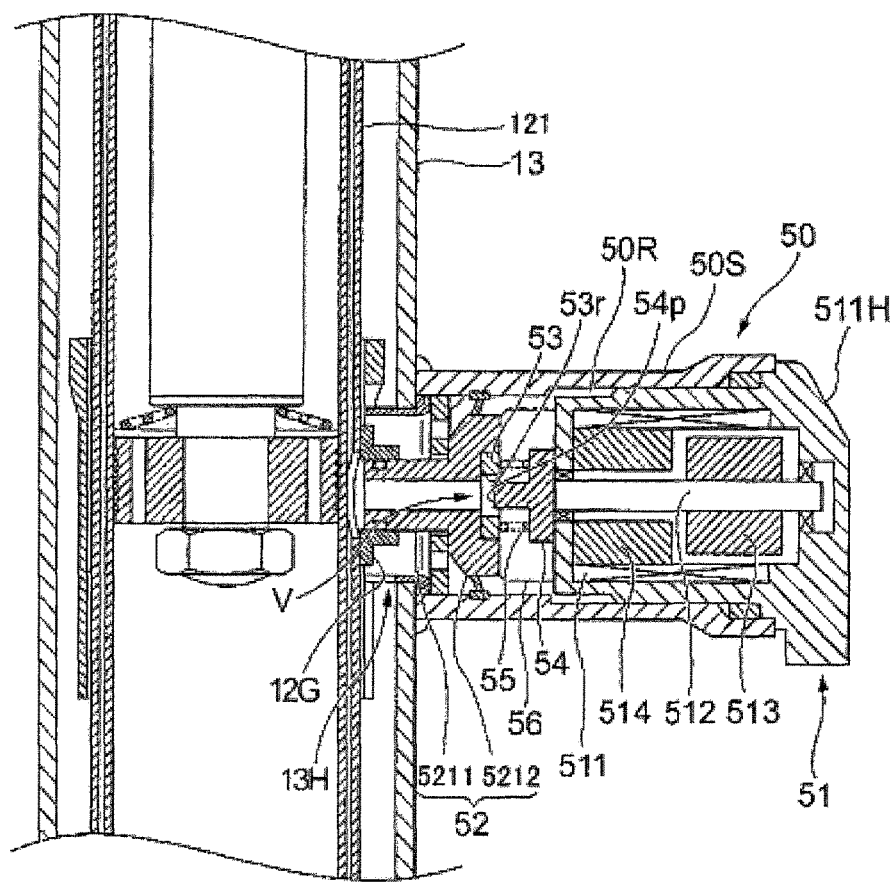
FIG. 4 is a cross-sectional view of a solenoid valve according to the first embodiment of the present invention.

FIG. 4 is a cross-sectional view of the solenoid valve 50 according to the first embodiment of the present invention. The solenoid valve 50 is provided on the side portion of the damper case 13. The solenoid valve 50 includes, as illustrated in FIG. 4, a solenoid cylinder 505, a solenoid mechanism (solenoid) 51, a suction port 52, a valve stopper 53, a valve body 54, a spring 55, and a discharge ring 56.

The solenoid cylinder 505 is provided such that one opening in the axial direction faces a case opening 13H of the damper case 13. In this embodiment, the solenoid cylinder 505 is provided on the side of the damper case 13 to extend in a direction intersecting the axial direction of the damper case 13.

The solenoid mechanism 51 includes a coil 511, a housing 511H, a plunger 512, a magnetic body 513, and a stationary core 514.

The coil 511 is located along the axial direction of the plunger 512 and is held by the housing 511H. The coil 511 is coupled to a non-illustrated conductor and generates a magnetic field upon receipt of electric power via the conductor. The electric power supplied to the coil 511 is controlled by a non-illustrated controller.

The plunger 512 is supported by the housing 511H via a bearing to be movable in the axial direction. The magnetic body 513 such as a magnet is securely mounted on the plunger 512. One end of the plunger 512 contacts the valve body 54.

The stationary core 514 is located closer to the valve body 54 than the magnetic body 513 in the axial direction of the plunger 512. The stationary core 514 is configured to be energized upon receipt of a magnetic field that is generated when electric power is supplied to the coil 511.

The suction port 52 is a member having an approximately cylindrical shape. In this embodiment, the suction port 52 includes a small diameter portion 5211 and a large diameter portion 5212. The diameter of the large diameter portion 5212 is greater than the diameter of the small diameter portion 5211. The small diameter portion 5211 is fitted inside a joint member 12G of an outer cylindrical body 121 via a sealing member. The large diameter portion 5212 faces the solenoid mechanism 51 with the discharge ring 56 located in between.

The valve stopper 53 is a thick cylindrical member and defines a ring-shaped passage 53r for oil on the inner side of the valve stopper 53. The valve stopper 53 is secured to the inner side of the large diameter portion 5212 of the suction port 52.

The valve body 54 is a columnar member and further has a columnar distal end 54p. The distal end 54p projects from the center portion of the valve body 54 in the axial direction. The valve body 54 is provided such that the distal end 54p faces the valve stopper 53 and is configured such that the distal end 54p regulates the ring-shaped passage 53r. The valve body 54 receives force from the plunger 512 at the end further from the valve stopper 53 and moves in the axial direction.

The spring 55 is located between the valve stopper 53 and the valve body 54. The spring 55 exerts spring force in a direction such that the distance between the valve stopper 53 and the valve body 54 is increased.

The discharge ring 56 is a columnar member and includes a plurality of circular openings that are formed on the outer surface in the circumferential direction. The discharge ring 56 is located around the valve stopper 53, the valve body 54, and the spring 55 and discharges the oil that has passed through a narrowed portion V, which will be described later, into a cylinder inner chamber 50R.

In this embodiment, the ring-shaped passage 53r of the valve stopper 53 and the distal end 54p of the valve body 54 define the narrowed portion V for the oil in the solenoid valve 50. That is, the solenoid valve 50 of this embodiment generates damping force by narrowing the cross-sectional area of the oil passage at the narrowed portion V. Varying the distance between the valve stopper 53 and the valve body 54 with the plunger 512 of the solenoid mechanism 51 further changes the cross-sectional area of the passage for the flow of oil to adjust the damping force.

Oil in the suspension may be electromagnetic fluid. The solenoid mechanism 51 may be a proportional solenoid. The proportional solenoid changes the projecting position of the plunger 512 based on the value of the supplied current. Using the proportional solenoid allows the projecting position of the plunger 512 to be freely adjusted by, for example, changing the duty ratio as required.

Configuration of ECU 600

Figure 5:
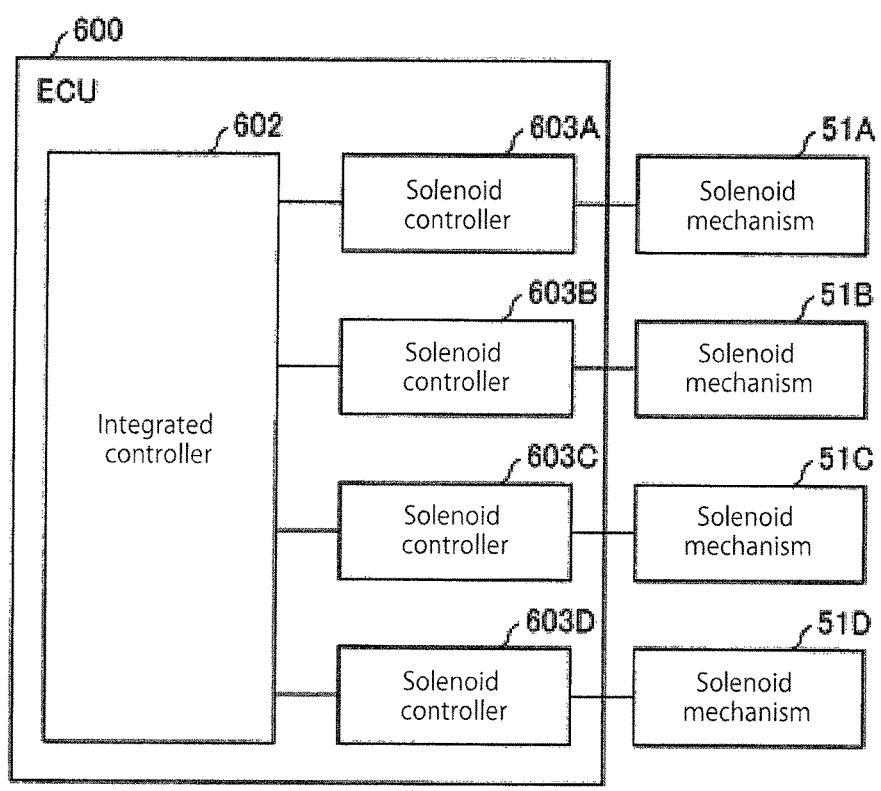
FIG. 5 is a block diagram illustrating the configuration of an ECU according to the first embodiment of the present invention.

FIG. 5 is a block diagram illustrating the configuration of the ECU 600 according to this embodiment. The ECU 600 includes an integrated controller 602 and solenoid controllers 603A to 603D. The integrated controller 602 is capable of communicating with each of the solenoid controllers 603A to 603D and, in particular, transmits and receives a current upper limit value (current limitation value). The current upper limit value refers to the upper limit vale of current supplied by each of the solenoid controllers 603A, 603B, 603C, and 603D to the associated one of the solenoid mechanisms 51A, 51B, 51C, and 51D.

The solenoid controllers 603A to 603D transmit and receive the current upper limit value to and from the integrated controller 602 and each adjust the value of current supplied to the associated one of the solenoid mechanisms 51A to MD based on the current upper limit value.

The solenoid mechanisms 51A, 51B, 51C, and 51D respectively control damping forces of the suspensions of the front left wheel (FL), the front right wheel (FR), the rear left wheel (RL), and the rear right wheel (RR).

Configuration of Solenoid Controller 603A

Figure 6:
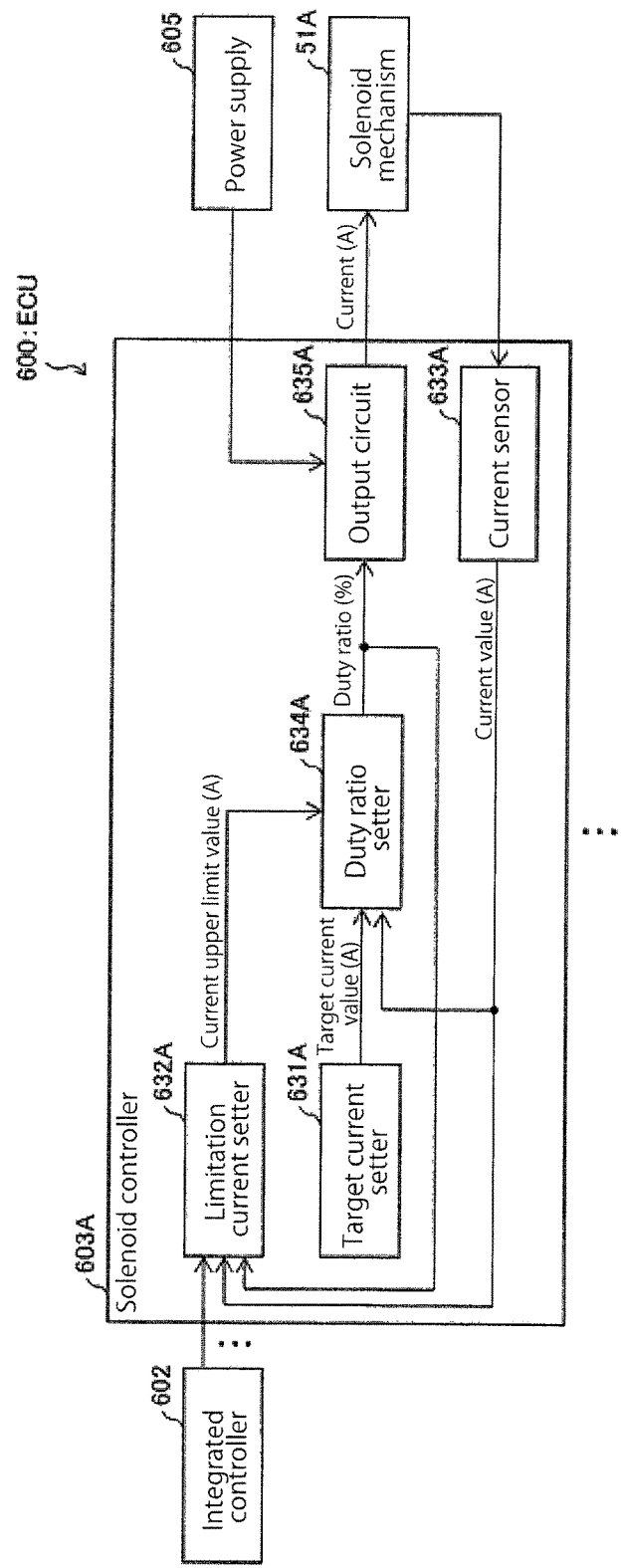
FIG. 6 is a block diagram illustrating the configuration of a solenoid controller according to the first embodiment of the present invention.

FIG. 6 is a block diagram illustrating the configuration of the solenoid controller 603A according to this embodiment. As illustrated in FIG. 6, the solenoid controller 603A includes a target current setting unit 631A, a current limitation setting unit 632A, a current sensor (current detector) 633A, a duty ratio setting unit 634A, and an output circuit (current outputting unit) 635A.

The target current setting unit 631A sets a target value of current (target current value) to be supplied to the solenoid mechanism 51A. More specifically, the target current setting unit 631A individually sets a target current value for the associated wheel based on the traveling state of the vehicle 900. The target current value is set based on, for example, a target damping force and the stroke speed of the suspension 100A. This embodiment, however, is not limited to the above method.

The current limitation setting unit 632A sets the upper limit value of the current to be supplied to the solenoid mechanism 51A. The current limitation setting unit 632A changes the current upper limit value based on the duty ratio set by the duty ratio setting unit 634A. This configuration appropriately adjusts the value of the current supplied to the solenoid mechanism 51A, which controls the damping force of the suspension. The current limitation setting unit 632A may change the current upper limit value based on the current value detected by the current sensor 633A. The current limitation setting unit 632A is capable of communicating with the integrated controller 602, transmits a changed current upper limit value to the integrated controller 602, receives a current upper limit value in response to the transmission, and sets the received current upper limit value.

The current sensor 633A detects the current value of the current supplied to the solenoid mechanism 51A. The duty ratio setting unit 634A sets the duty ratio based on the target current value, the current upper limit value, and the current value detected by the current sensor 633A. For example, the duty ratio setting unit 634A makes the duty ratio targeted on one of the target current value and the current upper limit value that has a smaller value. This configuration allows an appropriate current to be supplied to the solenoid mechanism MA. The output circuit 635A supplies current that corresponds to the duty ratio set by the duty ratio setting unit 634A and the voltage of the power supply 605 (power supply voltage) to the solenoid mechanism 51A.

The solenoid controllers 603B, 603C, and 603D have a configuration similar to the configuration of the solenoid controller 603A.

Processing of Solenoid Controller 603A

Figure 7:
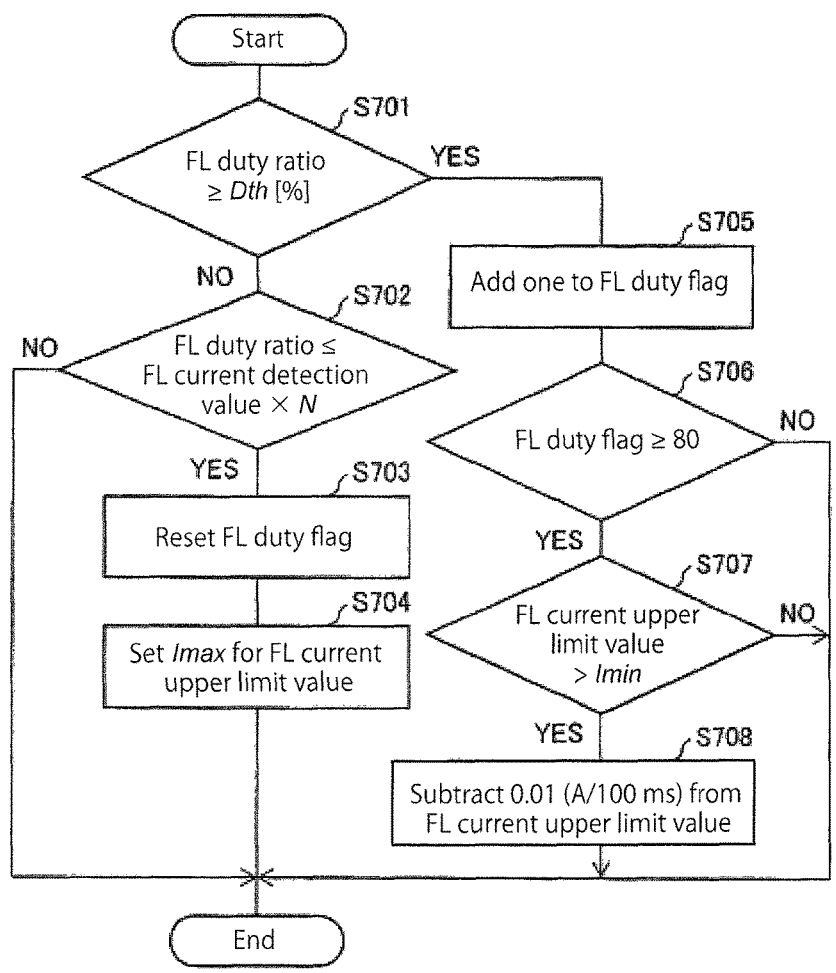
FIG. 7 is a flowchart illustrating processing of the solenoid controller according to the first embodiment of the present invention.

FIG. 7 is a flowchart illustrating processing of the solenoid controller 603A according to this embodiment. This processing is repeatedly performed at every 0.1 second after the ignition of the vehicle 900 has been switched on. The solenoid controllers 603B, 603C, and 603D perform processing similar to this processing.

The current limitation setting unit 632A of the solenoid controller 603A determines whether a FL duty ratio is equal to or more than Dth (S701). Dth is a threshold value for determining whether the electric power is insufficient. The threshold value Dth may be, for example, 99.7 [%] or may also be other values.

When the FL duty ratio is not equal to or more than the threshold value Dth, that is, when the FL duty ratio is less than the threshold value Dth (NO at step S701), the current limitation setting unit 632A makes a determination as to whether the FL duty ratio is equal to or less than the FL current detection value ×N (S702). N is a threshold value for determining whether there is room for achieving a predetermined current value. The threshold value N is 61.4 when the current value is 1.6 [A], but may be other values.

When the FL duty ratio is equal to or less than the FL current detection value ×N (YES at step S702), the current limitation setting unit 632A resets a FL duty flag (S703). The FL duty flag is a flag for counting duration of the state in which the electric power is insufficient. The current limitation setting unit 632A sets Imax for the FL current upper limit value (S704). Imax is the maximum value of the FL current upper limit value and may be 1.6 [A] or other values.

When the determination made at step S702 is that the FL duty ratio is not equal to or less than the FL current detection value ×N, that is, when the FL duty ratio is greater than the FL current detection value ×N (NO at step S702), the current limitation setting unit 632A ends the processing.

When the determination made at step S701 is that the FL duty ratio is equal to or more than the threshold value Dth (YES at step S701), the current limitation setting unit 632A calls a value of the FL duty flag stored in the memory, adds one to the FL duty flag (S705), and saves the value of the FL duty flag after the addition.

Subsequently, the current limitation setting unit 632A determines whether the FL duty flag is equal to or more than 80 (S706). The number 80 is a threshold value of the time for determining whether the state in which the electric power is insufficient has been continued for a sufficient time and means that 0.1 second (activation cycle of this process) ×80=8 seconds. The number 80 may be other values.

When the FL duty flag is equal to or more than 80 (YES at step S706), the current limitation setting unit 632A determines whether the FL current upper limit value is greater than Imin (S707). Imin is the minimum value of the FL current upper limit value and may be 1.3 [A], or may be other values.

When the FL current upper limit value is greater than the minimum value Imin (YES at step S707), the current limitation setting unit 632A subtracts 0.01 [A/100 ms] from the FL current upper limit value (S708). The number 0.01 means that the subtraction is performed at the rate of 0.1 [A] per one second. The number 0.01 may be other values.

When the determination made at step S706 is that the FL duty flag is not equal to or more than 80, that is, when the FL duty flag is less than 80 (NO at step S706), or when the determination made at step S707 is that the FL current upper limit value is not greater than the minimum value Imin, that is, when the FL current upper limit value is equal to or less than the minimum value Imin (NO at step S707), the current limitation setting unit 632A ends the processing.

In the above-described processing, the current limitation setting unit 632A reduces the FL current upper limit value on a stepwise basis when the duty ratio set by the duty ratio setting unit 634A is equal to or more than the threshold value Dth (predetermined value) for eight seconds (predetermined period). This configuration inhibits a phenomenon in which the value of current supplied to the solenoid mechanism 51A remains high.

When the relationship between the duty ratio set by the duty ratio setting unit 634A and the current value detected by the current sensor 633A satisfies a predetermined relationship "FL duty ratio≤FL current detection value×N" (a second relationship), the current limitation setting unit 632A returns the FL current upper limit value to the maximum value Imax that is a value before being decreased on a stepwise basis. This configuration returns the value of current supplied to the solenoid mechanism 51A to the original value.

Figure 8:
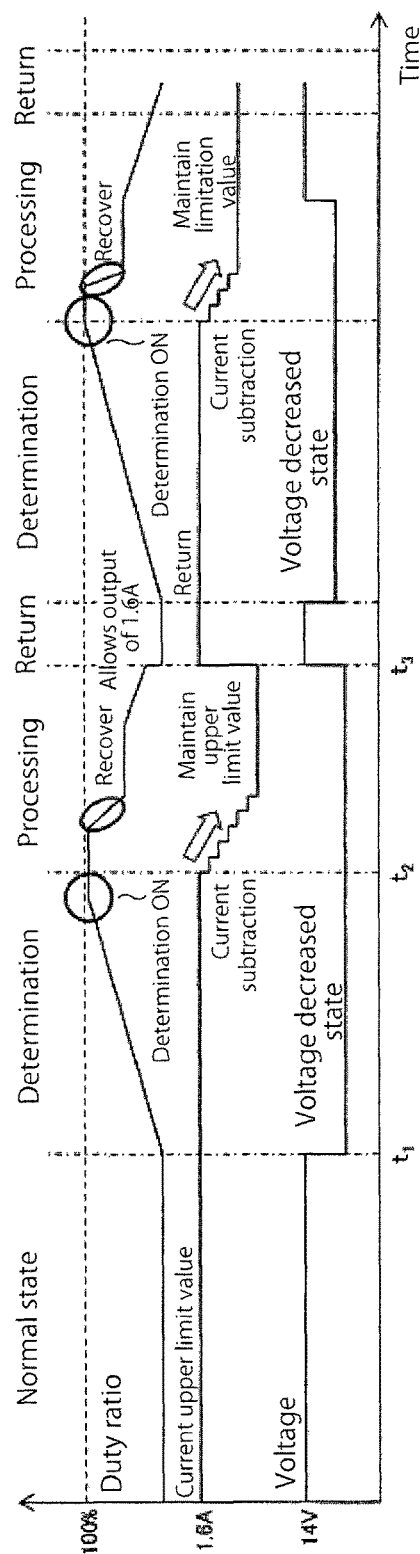
FIG. 8 is a graph illustrating changes over time in the duty ratio, the current upper limit value, and the voltage according to the first embodiment of the present invention.

FIG. 8 is a graph illustrating changes over time of the duty ratio, the current upper limit value, and the voltage controlled by the solenoid controller 603A of this embodiment. In FIG. 8, the horizontal axis represents time, the vertical axis represents the duty ratio set by the duty ratio setting unit 634A, the upper limit value of current supplied to the solenoid mechanism 51A, and the voltage of the power supply 605.

When the voltage of the power supply 605 is decreased (at time $t_1$ in FIG. 8), the solenoid controller 603A gradually increases the duty ratio to maintain the upper limit value of the current supplied to the solenoid mechanism 51A. Subsequently, when a predetermined time (for example, eight seconds) has elapsed with the duty ratio close to 100%, the solenoid controller 603A starts processing to decrease the current upper limit value on a stepwise basis (time $t_2$ in FIG. 8). When the current upper limit value is decreased to a predetermined minimum value, the solenoid controller 603A maintains the minimum value. When the voltage decreased state is cancelled, the solenoid controller 603A returns the current upper limit value to the original current value (time $t_3$ in FIG. 8).

Processing of Integrated Controller 602

Figure 9:
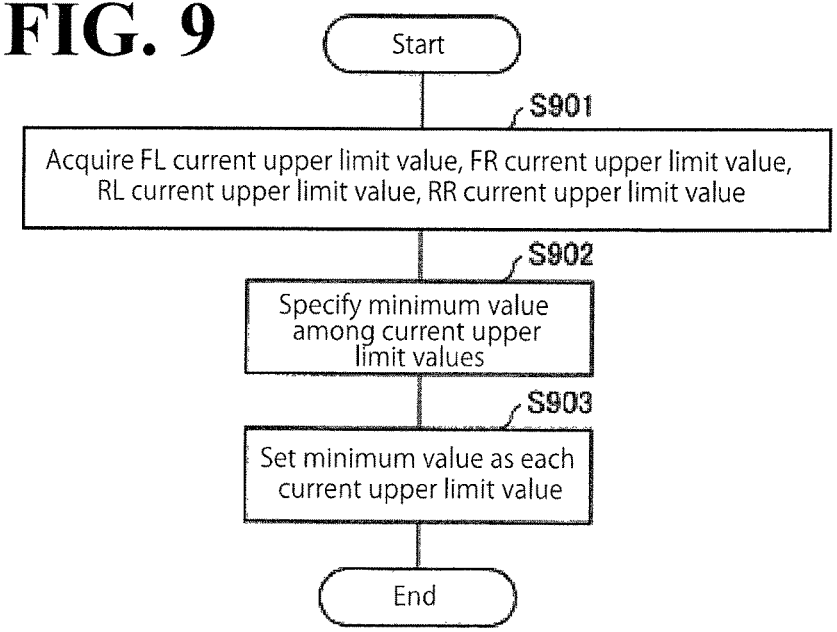
FIG. 9 is a flowchart illustrating processing of an integrated controller according to the first embodiment of the present invention.

FIG. 9 is a flowchart illustrating processing of the integrated controller 602 according to this embodiment. This processing is performed at the end of each processing of the solenoid controllers 603A, 603B, 603C, and 603D performed at every 0.1 second.

First, the integrated controller 602 obtains the FL current upper limit value, the FR current upper limit value, the RL current upper limit value, and the RR current upper limit value (S901). More specifically, the integrated controller 602 obtains the FL current upper limit value from the current limitation setting unit 632A, the FR current upper limit value from the current limitation setting unit 632B, the RL current upper limit value from the current limitation setting unit 632C, and the RR current upper limit value from the current limitation setting unit 632D.

Subsequently, the integrated controller 602 specifies the minimum value among the FL current upper limit value, the FR current upper limit value, the RL current upper limit value, and the RR current upper limit value that have been obtained (S902).

The integrated controller 602 then sets the specified minimum value as the FL current upper limit value, the FR current upper limit value, the RL current upper limit value, and the RR current upper limit value (S903). More specifically, the integrated controller 602 sends the specified minimum value to the current limitation setting units 632A, 632B, 632C, and 632D.

Upon execution of the above-described processing, the current limitation setting unit 632A makes reference to the current upper limit value corresponding to the FL suspension and performs processing for setting a new current upper limit value corresponding to the FL suspension. This configuration appropriately adjusts the value of current supplied to the solenoid of each suspension based on the current upper limit value corresponding to each suspension.

More specifically, in the processing to set a new FL current upper limit value corresponding to the FL suspension, the current limitation setting unit 632A sets the lowest current upper limit value among the current upper limit values corresponding to the suspensions as a new current upper limit value corresponding to the FL suspension. This configuration limits the value of current supplied to the solenoid mechanism 51A. The current limitation setting units of the solenoid controllers 603B, 603C, and 603D also perform processing similar to this processing.

Second Embodiment

In a second embodiment of the present invention, the solenoid controller 603A decreases the current upper limit value under a condition different from the condition of the first embodiment.

Figure 10:
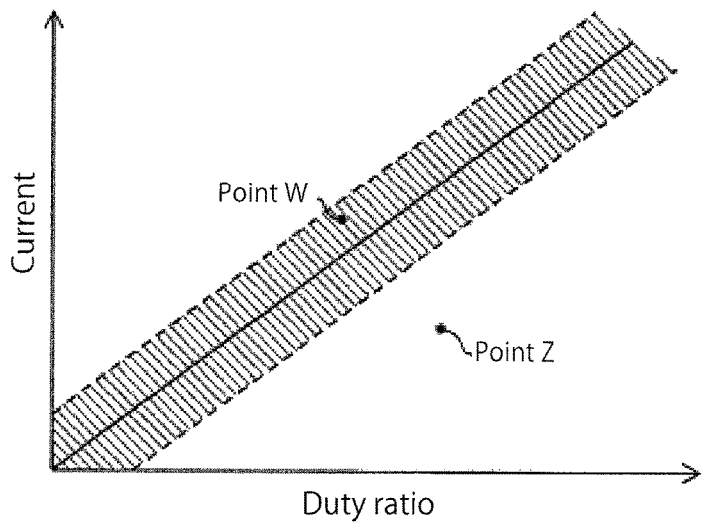
FIG. 10 is a graph illustrating the relationship between the duty ratio and the current according to a second embodiment of the present invention.

FIG. 10 is a graph illustrating the relationship between the duty ratio and the current according to the second embodiment of the present invention. In the graph, the horizontal axis represents the duty ratio set by the duty ratio setting unit 634A, and the vertical axis represents the current supplied to the solenoid mechanism 51A. In FIG. 10, if a point (for example, a point W) indicating the correspondence between the duty ratio and the current is within the shaded area representing a linear relationship (first relationship), the solenoid controller 603A does not change the current upper limit value. If the point is lower than the shaded area (for example, a point Z), the solenoid controller 603A decreases the current upper limit value.

More specifically, in the solenoid controller 603A, if the relationship between the duty ratio set by the duty ratio setting unit 634A and the current value detected by the current sensor 633A no longer satisfies the predetermined linear relationship, the current limitation setting unit 632A decreases the current upper limit value on a stepwise basis. This configuration inhibits the phenomenon in which the current supplied to the solenoid mechanism MA is maintained at an inappropriate value.

The solenoid controllers 603B, 603C, and 603D perform processing similar to the processing of the solenoid controller 603A.

Third Embodiment

In a third embodiment of the present invention, the solenoid controller 603A returns the current upper limit value by a method different from the method of the first embodiment.

When the solenoid controller 603A of the ECU 600 according to the third embodiment returns the current limitation value to a previous value that is before the current limitation value was decreased on a stepwise basis, the solenoid controller 603A returns the current upper limit value on a stepwise basis. For example, instead of the processing of S704 in FIG. 7, the solenoid controller 603A performs processing in which the solenoid controller 603A determines whether the FL current upper limit value is less than the maximum value Imax, adds 0.01 [A] to the FL current upper limit value when the FL current upper limit value is less than the maximum value Imax, and does not add 0.01 [A] to the FL current upper limit value when the FL current upper limit value is equal to or more than the maximum value Imax. This processing increments the FL current upper limit value by 0.01 [A] at every 0.1 second until the maximum value Imax has been reached. The time period 0.1 second is the activation cycle of the solenoid controller 603A.

The solenoid controllers 603B, 603C, and 603D perform processing similar to the processing of the solenoid controller 603A.

Fourth Embodiment

In a fourth embodiment of the present invention, the integrated controller 602 sets the current upper limit value by a method different from the method of the first embodiment.

In general, the target current value may differ depending on each wheel. For this reason, the ECU 600 of the fourth embodiment may set a different current upper limit value for each wheel. For example, the integrated controller 602 may be configured to adjust the current upper limit value of each wheel to maintain the ratio of the target current values of the wheels. More specifically, when the target current values for FL, FR, RL, and RR are represented by $I\_{tar\_FL}$, $I\_{tar\_FR}$, $I\_{tar\_RL}$, and $I\_{tar\_RR}$, and the current upper limit values are represented by $I\_{lim\_FL}$, $I\_{lim\_FR}$, $I\_{lim\_RL}$, and $I\_{lim\_RR}$, the integrated controller 602 may be configured to set the current upper limit values to satisfy the following equation:

$$I\_{tar\_FL}:I\_{tar\_FR}:I\_{tar\_RL}:I\_{tar\_RR}=I\_{lim\_FL}:I\_{lim\_FR}:I\_{lim\_RL}:I\_{lim\_RR}.$$

The configurations according to the above embodiments are advantageous in that the values of current supplied to the solenoids are appropriately adjusted for the suspensions of automobiles, in particular, the suspensions of four wheels not only in engine-driven automobiles but also in motor-driven automobiles.

Implementation Using Software

A control block of the ECU 600 (in particular, the integrated controller 602 and the solenoid controllers 603A, 603B, 603C, 603D) may be implemented by a logic circuit (hardware) formed on, for example, an integrated circuit (IC chip) or by a software using a central processing unit (CPU).

In the latter case, the ECU 600 includes a CPU, a read only memory (ROM) or a recording device (referred to as a recording medium), and a random access memory (RAM). The CPU executes a command of a program, which is software for performing each function. The ROM stores the above-described program and various data to be readable by a computer (or the CPU). The RAM develops the above-described program. The object of the present invention is achieved by reading the above-described program from the above-described recording medium by the computer (or the CPU) and executing the program. The above-described recording medium may be "a non-temporary concrete medium" such as a tape, a disk, a card, a semiconductor memory, or a programmable logical circuit. The above-described program may be supplied to the above-described computer via a transmitting medium (such as a communication network and airwave) that is capable of transmitting the program. The present invention may be implemented by electronically transmitting the above-described program in a form of data signals embedded in a carrier wave.

The suspension controller preferably adjusts the value of the current supplied to the solenoid in an appropriate manner even if fluctuation of power supply voltage or change in the temperature of the solenoid occurs.

The suspension controller of the embodiments appropriately adjusts the value of the current supplied to the solenoid that controls the damping force of the suspension.

Obviously, numerous modifications and variations of the present invention are possible in light of the above teachings. It is therefore to be understood that within the scope of the appended claims, the present invention may be practiced otherwise than as specifically described herein.

What is claimed is:

1. A suspension controller for controlling a damping force of a suspension of a vehicle by controlling a current from a power supply to a solenoid of a shock absorber of the suspension,
wherein the suspension controller is configured to:
set a target current value;
set a current limitation value;
detect a current value of a first current supplied to the solenoid that is configured to control the damping force of the shock absorber of the suspension;
set a duty ratio based on the target current value, based on the current limitation value, and based on the detected current value;
supply the solenoid with a second current that corresponds to the duty ratio and to a power supply voltage; and
change the current limitation value based on the duty ratio,
wherein the current limitation value is an upper limit value that is supplied to the solenoid, and
when the duty ratio has continued to be equal to or more than a predetermined value for a predetermined period of time, the suspension controller is configured to decrease the current limitation value on a stepwise basis with respect to time.

2. The suspension controller according to claim 1, wherein when a relationship between the duty ratio and the current value satisfies a predetermined second relationship, the suspension controller is configured to return the current limitation value to a previous value that is before the current limitation value was decreased on the stepwise basis.

3. The suspension controller according to claim 2, wherein the suspension controller is configured to make the duty ratio targeted on a smaller one of the target current value and the current limitation value.

4. The suspension controller according to claim 1, wherein the suspension controller is configured to make the duty ratio targeted on a smaller one of the target current value and the current limitation value.

5. A suspension apparatus comprising a suspension and the suspension controller according to claim 1.

6. The suspension controller according to claim 1, comprising:
an integrated controller; and
four solenoid controllers, each of which solenoid controllers is connected to the integrated controller and the suspension of a wheel, wherein
a value of current supplied to the solenoid is adjusted based on the current limitation value corresponding to each suspension.

7. The suspension controller according to claim 1, wherein when the power supply voltage is decreased, the suspension controller is configured to gradually increase the duty ratio to maintain the current limitation value.

8. The suspension controller according to claim 1, wherein when the current limitation value is decreased to a predetermined minimum value, the suspension controller is configured to maintain the predetermined minimum value.

9. The suspension controller according to claim 1, wherein the solenoid comprises a solenoid valve that generates the damping force by narrowing an oil passage provided in the solenoid valve.

10. A suspension controller for controlling a damping force of a suspension of a vehicle by controlling a current from a power supply to a solenoid of a shock absorber of the suspension,
wherein the suspension controller is configured to:
set a target current value;
set a current limitation value;
detect a current value of a first current supplied to the solenoid that is configured to control the damping force of the shock absorber of the suspension;
set a duty ratio based on the target current value, based on the current limitation value, and based on the detected current value;
supply the solenoid with a second current that corresponds to the duty ratio and to a power supply voltage; and
change the current limitation value based on the duty ratio,
wherein the current limitation value is an upper limit value that is supplied to the solenoid, and
wherein when a relationship between the duty ratio and the current value no longer satisfies a predetermined first relationship, the suspension controller is configured to decrease the current limitation value on a stepwise basis with respect to time.

11. The suspension controller according to claim 10, wherein when the relationship between the duty ratio and the current value satisfies a predetermined second relationship, the suspension controller is configured to return the current limitation value to a previous value that is before the current limitation value was decreased on the stepwise basis.

12. The suspension controller according to claim 10, wherein the suspension controller is configured to make the duty ratio targeted on a smaller one of the target current value and the current limitation value.

* * * * *